(12) United States Patent
Abe et al.

(10) Patent No.: US 6,989,615 B2
(45) Date of Patent: Jan. 24, 2006

(54) STEPPING MOTOR

(75) Inventors: Shotaro Abe, Tokyo (JP); Hideyuki Takahashi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 96 days.

(21) Appl. No.: 10/797,750

(22) Filed: Mar. 9, 2004

(65) Prior Publication Data

US 2004/0178685 A1 Sep. 16, 2004

(30) Foreign Application Priority Data

Mar. 10, 2003 (JP) .................... 2003-063498

(51) Int. Cl.
*H02K 37/16* (2006.01)

(52) U.S. Cl. .................. 310/49 R; 310/67 R; 310/216
(58) Field of Classification Search ............ 310/49 R, 310/89, 51, 67 R, 216, 217, 254, 259, 40 MM
See application file for complete search history.

(56) References Cited

U.S. PATENT DOCUMENTS 4,782,353 A * 11/1988 Ogihara et al. ............ 396/463
5,882,551 A * 3/1999 Dever et al. ............... 252/609
6,650,504 B2 * 11/2003 Ridl ......................... 360/132
6,670,731 B2 * 12/2003 Kotani et al. .............. 310/49 R

FOREIGN PATENT DOCUMENTS

| JP | 03231722 | 10/1991 |
| JP | 11-055929 | 2/1999 |
| JP | 2001-320865 | 11/2001 |
| JP | 2002-369489 | 12/2002 |

* cited by examiner

*Primary Examiner*—Tran Nguyen
*Assistant Examiner*—Leda Pham
(74) *Attorney, Agent, or Firm*—J.C. Patents

(57) ABSTRACT

A stepping motor includes a housing, a rotor and a stator received in the housing. The stator includes a yoke, which includes a frame portion surrounding the rotor and a plurality of projections projecting from the frame portion toward the rotor, cylindrical magnetizing coils inserted around the projections, respectively. Each of the magnetizing coils is adapted to receive supply of a pulse current, wherein an inner wall of the housing is formed with concaved portions to receive said magnetizing coils inserted around the respective projections, while being kept spaced from the rotor.

4 Claims, 3 Drawing Sheets

STEPPING MOTOR

FIELD OF THE INVENTION

The present invention relates to a stepping motor. In particular, the invention relates to a stepping motor to be suitably used as a driving device for an indicating instrument in a vehicle.

RELATED ART STATEMENT

In the stepping motor, a pulse current to be supplied to magnetizing coils of a stator can be controlled to control movement of a rotor which rotates upon receipt of magnetically attracting forces and repulsing forces between the stator.

In a small-sized stepping motor to be assembled into such a vehicle indicating instrument as a driving source, the rotor comprises a circular permanent magnet in which different magnetic poles are alternatively arranged in a circumferential direction, and the stator comprises a yoke at which magnetizing coils are provided. The yoke includes a frame portion arranged to surround the permanent magnet of the rotor and a plurality of projections projecting from the frame portion toward the magnetic poles-constituting face of the permanent magnet. The magnetizing coils are each forcedly fitted around the respective projections, and the rotation of the rotor is controlled by controlling the pulse current to be supplied to the magnetizing coils.

If the magnetizing coil forcedly fitted around the projection of the yoke suffers from loosing or the like and moves toward the rotor along the projection, the coil may consequently contact the rotor positioned around the tip of a leading edge of the projection. In that case, the rotor may be interfered with the coil, and smooth and sophisticated controlling of the rotor may be hindered.

Under the circumstances, it is proposed that a projection is formed projecting from the bottom face of the housing of the stepping motor such that the projection enters partially between the rotor and the magnetizing coil forcedly fitted around the projection of the yoke, whereby interfering contact between a permanent magnet as a rotor and a magnetizing coil is prevented by the projection rising from the bottom of the housing (For example, JP-A-2001-320865, p 5, FIG. 18).

The projection, which projects from the bottom of the housing receiving the rotor and the magnetizing coil such that it enters therebetween, is thin and thus disadvantageous from the standpoint of strength. If the thickness of the projection is increased to raise its strength, the increased thickness of the projection entering between the magnetizing coil and the rotor causes an enlarged gap between the magnetizing coil and the rotor and reduction in performance of the stepping motor. Enlargement in the gap between the magnetizing coil and the rotor causes increase in dimension of the motor itself.

SUMMARY OF THE INVENTION

It is therefore an object of the present invention to provide a stepping motor which can assuredly prevent interference between the rotor and the magnetizing coil without causing increased dimension or reduced performance.

The present invention relates to a stepping motor comprising a housing, a rotor and a stator received in the housing, said stator comprising a yoke, said yoke comprising a frame portion surrounding the rotor and a plurality of projections projecting from said frame portion toward the rotor, cylindrical magnetizing coils inserted around said projections, respectively and each adapted to receive supply of a pulse current, wherein an inner wall of the housing of the stepping motor is formed with concaved portions to partially receive said magnetizing coils inserted around the respective projections, respectively while being kept spaced from said rotor. The plural concaved portions may be formed as one continuous concaved portion.

According to the invention, since the magnetizing coil is partially received in the concaved portion formed in the inner wall of the housing in the state that the coil is inserted around the projection of the yoke of the stator, the coil is prevented from moving toward the rotor through engagement of the coil with a wall face of the concaved portion. This wall face of the concaved portion assuredly prevents the movement of the magnetizing coil without extending between the rotor and the magnetizing coil. Therefore, the interference between the rotor and the magnetizing coil can be assuredly prevented without the dimension of the stepping motor being increased by the entering of the projection between the rotor and the magnetizing coil like the conventional technique.

According to an aspect of the invention, the housing comprises an upper housing portion and a lower housing portion engageable with the upper housing portion, the upper and lower housing portions houses said yoke therebetween in cooperation with each other, said concaved portion is formed in at least one of the upper and lower housing portions and adapted to receive the magnetizing coil in cooperation with a wall face of the other housing portion, and a wall face rises from a bottom face of the concaved portion at a near side of the rotor and prevents contacting between the magnetizing coil and the rotor through contacting the magnetizing coil. Since at least one housing portion is formed with the concaved portion, the magnetizing coil can be relatively easily and assuredly prevented from moving toward the rotor from a given location.

According to a further aspect of the invention, each of the magnetizing coils comprises a bobbin and a wound wire, said bobbin comprises a barrel portion inserted around the corresponding projection of the yoke and a pair of flange portions formed at opposite ends of the barrel portion, said wound wire is wound around the barrel portion, and the movement of the magnetizing coil toward the rotor is prevented by contacting that one of the flange portions which is positioned at a side of the rotor with said wall face. The interference between the magnetizing coil and the rotor can be assuredly prevented through the wall face of the concaved portion being brought into contact with the flange portion provided at the bobbin of the magnetizing coil.

According to a still further aspect of the invention, upper edge portions of the rising wall faces of the concaved portions are chamfered. The chamfered upper edge portions of the wall faces of the concaved portions prevent the phenomenon that the unchamfered upper edge portion of the concaved portion damages the magnetizing coil during assembling the magnetizing coil into the concaved portion when in constructing the stepping motor, the magnetizing coil inserted around the projection of the yoke is inserted together with the yoke into one of the housing portions in which the concaved portion is provided.

"According to still further aspects of the invention, in the stepping motor, upper edge portions of the rising wall faces of the concaved portions are chamfered, the chamfered upper edge of the rising wall face of the concaved portion of the housing portion is an inclined face having a vertically descending angle toward a bottom of the concaved portion for facilitation arranging of the magnetizing coil into the concaved portion. Since the inclined chamfered face functions as a guide fae to guide the magnetizing coil into the concaved portion, it facilitiates the operatio of fitting the magnetizing coil inserted around the yoke into the housing portion."

BRIEF DESCRIPTION OF THE DRAWINGS

For a better understanding of the invention, reference is made to the attached drawings, wherein.

DETAILED DESCRIPTION OF THE INVENTION

Figure 1:
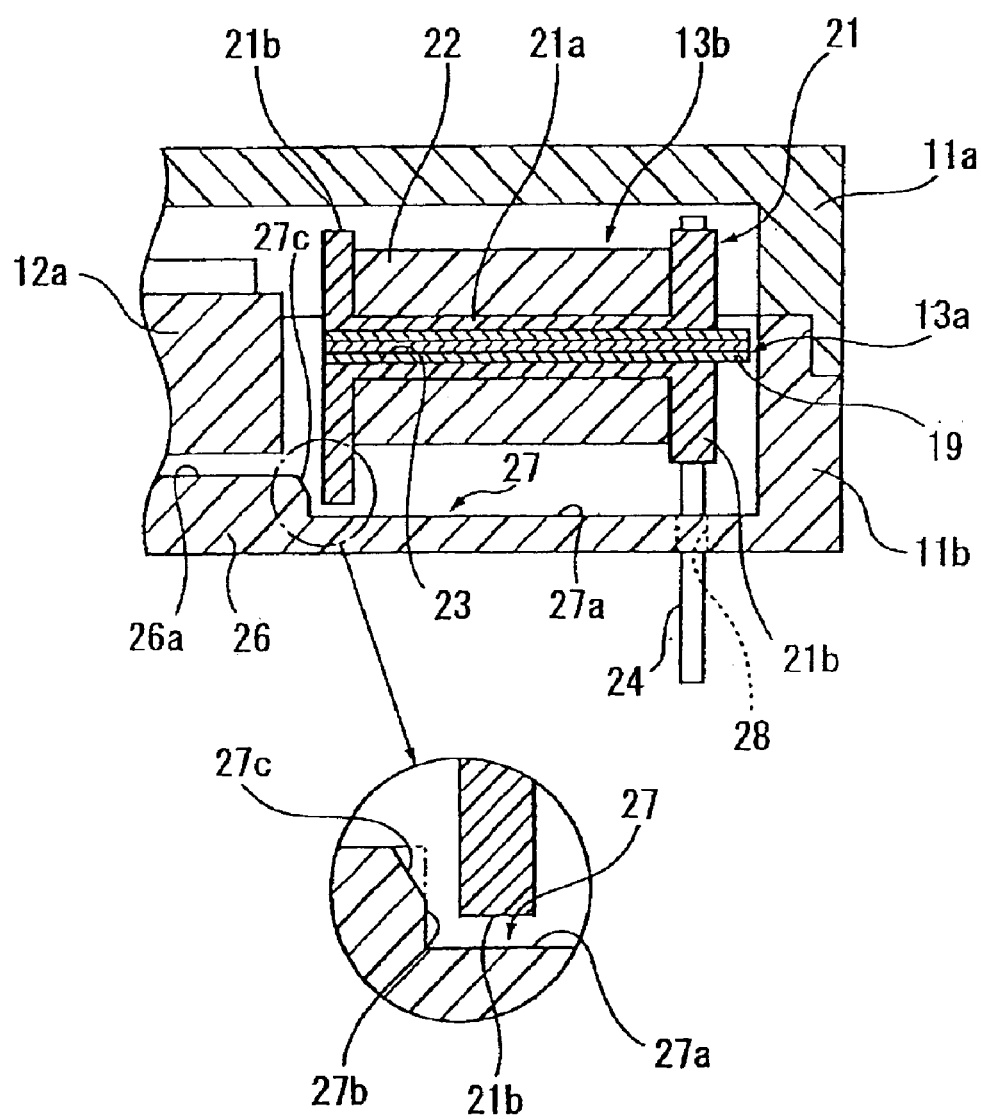
FIG. 1 is an enlarged sectional view of showing a principal portion of an embodiment of the stepping motor according to the present invention.

The characteristics of the present invention will be explained in more detail with reference to an embodiment illustrated in the drawings.

FIG. 1 shows a principal portion of the stepping motor according to the present invention. Prior to the explanation along with FIG. 1, the entire construction of the stepping motor will be explained with reference to FIGS. 2 and 3.

Figure 2:
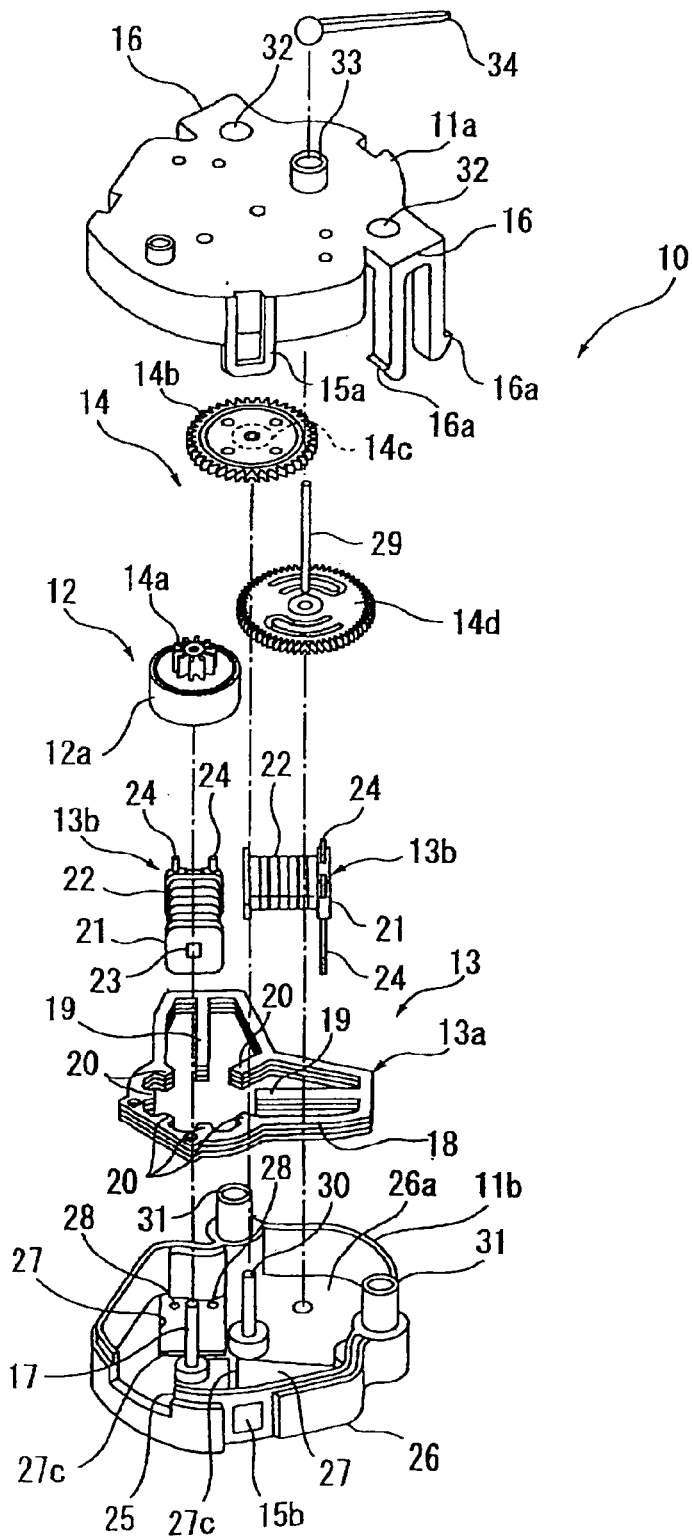
FIG. 2 is a perspective view of the stepping motor of the invention as decomposed.

One embodiment of the stepping motor 10 according to the present invention of which a principal portion is shown in a decomposed perspective view of FIG. 2 comprises a housing 11 (11a to 11d), and a rotor 12 and a stator 13 received in the housing. In the illustrated embodiment, a speed-reducing gear row 14 (14a to 14d) is assembled into the housing 11.

The housing 11 comprises an upper housing portion 11a and a lower housing portion 11b made of a synthetic resin which are to be dissembled from each other. The upper and lower housing portions 11a and 11b are integrally joined to each other by engaging a locking portion 15a provided at the upper housing portion 11a with a projection 15b provided at the lower housing portion 11b, thereby constituting the housing 11. The housing 11 is fixed to a fitting board not shown, by locking a pair of hooks 16a to an edge portion of a fitting hole of the fitting board. The hooks 16a are provided at tips of a pair of leg portions 16 extending downwardly from the upper housing portion 11a to beneath the lower housing portion 11b.

The rotor 12 housed in the housing 11 comprises a cylindrical magnet disc 12a having magnetic faces of different magnetic poles alternatively arranged in a circumferential direction thereof. The magnet disc 12a is rotatably supported around a supporting shaft 17 of which end portions are held by the housing portions 11a and 11b, respectively. A pinion 14a is fixed to one face of the magnet disc 12a coaxially with the magnet disc. The pinion 14a rotates together with the magnet disc 12a.

A stator 13, which magnetically acts upon the rotor 12, i.e., the magnet disc 12a, comprises a yoke 13a arranged surrounding the magnet disc 12a within the housing 11 and magnetizing coils 13b provided at the yoke. The yoke 13a comprises laminated yoke sheets. The yoke 13 a comprises a frame portion 18 surrounding the magnet disc 12a while spaced from the magnet disc, two main projections 19 extending from the frame portion toward the magnet disc 12a, and a plurality of auxiliary projections 20. Two main projections 19 are arranged around the magnet disc 12a, extending toward the magnet disc in an angular relation of right angles with respect to each other. Those tip faces of the projections 19 and the auxiliary projections 20 which are near the peripheral face of the magnet disc 12a are arranged equidistantly in the circumferential direction of the magnet disc.

Each of the magnetizing coils 13b is provided at the corresponding main projection 19. Each magnetizing coil 13b comprises a bobbin 21 made of an electrically insulating material and a wound wire 22 wound around the bobbin. As shown in FIG. 1, the bobbin 21 comprises a barrel portion 21a which is formed with a through-hole 23 for receiving the corresponding main projection 19 of the yoke 13a and a pair of flange portions 21b formed at opposite ends of the barrel portion. The wound wire 22 is wound around the barrel portion 21a between the opposite flange portions 21b, and its opposite portions are led to a pair of connection terminals 24 penetrating one of the flanges 21b in a direction orthogonal to the thickness direction of the flange 21b to receive electricity.

Each magnetizing coil 13b is forcedly fitted around the corresponding main projection 19 such that the connection terminals 24 are located on a base portion of the main projection 19, while being extended downwardly.

Figure 3:
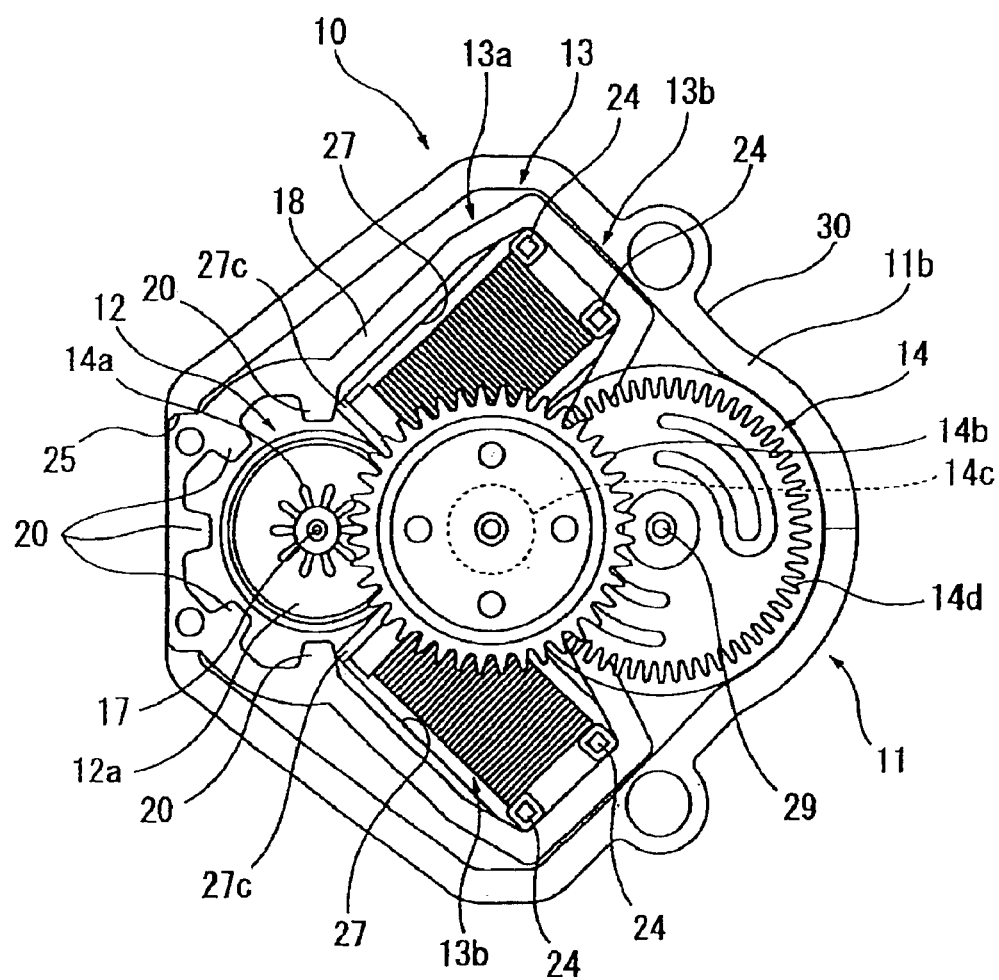
FIG. 3 is a plane view of the stepping motor of the present invention in the state that an upper housing portion is removed.

As shown in FIG. 3, the yoke 13a is placed inside the lower housing portion 11b while a part of it is received in a cut portion 25 provided in the lower housing portion 11b so that the magnetic pole faces constituted by tip end faces of the projections 19 and the auxiliary projection 20 may be near the peripheral face of the magnet disc 12a. Further, as clearly shown in FIG. 1, when the yoke 13a is arranged inside the lower housing portion 11b, a lower portion of each of the magnetizing coils inserted around the respective projections 19 is arranged in a concaved portion 27 of a rectangular planar shape formed in an inner face 26a of a bottom wall 26 of the lower housing portion 11b. The connection terminals 24 of each magnetizing coils 13b is extended out from the lower housing portion 11b via guide holes 28.

When pulse currents are supplied to the magnetizing coils 13b via the connection terminals 24 while phases of the pulse currents are staggered, as well known heretofore, magnetically attracting forces and magnetically repulsion forces act between the magnetic pole faces at the tips of the projections 19 and 20 of the yoke 13a and the magnetic pole face of the magnet disc 12a. The magnet disc 12a rotates around the supporting shaft 17 in response to the supply of the pulse currents to the magnetizing coils 13b owing to these magnetically interacting forces.

In order to transmit the rotation of the magnet disc 12a to an output shaft 29 at a reduced speed, a speed-reducing gear row 14 containing a pinion 14a provided at the magnet disc 12a is assembled. As shown in FIGS. 2 and 3, an intermediate gear 14b, which has a rotary shaft 30 supported by the housing portions 11a and 11b, meshes with the pinion 14a. A pinion 14c rotates coaxially and integrally with the intermediate gear 14b, and an output gear 14d meshes with the pinion 14c and is fixedly joined to the output shaft 29. The rotation of the magnet disc 12, that is, the rotation of the rotor 12, is retarded and outputted to the output shaft 29 owing to this meshing relationship among the speed-reducing gear row 14.

After the yoke 13a is assembled into the lower housing portion 11b, the speed-reducing gear row 14 is incorporated, and then a pair of locating boss portions 31 provided at the lower housing portion 11b are fitted into corresponding locating holes 32 at the upper housing portion 11a. Thereby, both the housing portions 11a and 11b can be aligned with each other in a properly positional relationship. After the positional alignment, as mentioned above, the locking portion 15a provided at the upper housing portion 11a is engaged with the projection 15b at the lower housing portion 11b. Thereby, the stepping motor 10 is completely assembled.

In the thus assembled state, each of the magnetizing coils 13b is received in a space between defined both the concaved portion 27 provided in the lower housing portion 11b and that wall face of the upper housing portion which is opposed to the concaved portion. When the stepping motor 10 is assembled, the output shaft 29 projects outwardly through a boss portion 33 provided at the upper housing portion 11a. To a tip of the output shaft 29 projecting from the boss portion 33 is fixed an indicating needle 34 (See FIG. 2) for indicating a scale of a display disc of a gauge in a vehicle (not show), for example.

In the stepping motor 10 of the present invention, as shown in FIG. 1, the magnetizing coils 13b of the stator 13 are partially fitted in the respective concaved portions 27 of the lower housing portion 11b in the state that the coils 13b are forcedly fitted around the corresponding projections 19 of the yoke 13a.

The concaved portion 27 is defined by a stepped portion formed in an inner face 26a of a bottom wall 26 of the lower housing portion 11, and a vertical wall face 27b rises from a bottom base 27a of the concaved portion 27 of the stepped portion, and is located in an intermediate position between the magnet disc 12 and the flange portion 21b of the magnetizing coil 13b near the magnet disc 12a. Therefore, even if the magnetizing coil 13b forcedly fitted into the main projection 19 is loosed by vibration or the like and consequently moves toward the magnet disc 12a along the main projection 19, the vertical wall face 27b of the concaved portion 27 contacts adjacent one of the flange portions, 21b, of the magnetizing coil 13b. Thus, the movement of the magnetizing coil 13b toward the magnet disc 12a, i.e., the rotor 12, over the vertical wall face 27b is assuredly prevented.

Unlike the conventional projection, the vertical wall face 27b does not enter between the magnet disc 12a and the magnetizing coil 13b. Therefore, it never causes a gap between the magnet disc 12a and the magnetizing coil 13b to increase due to the entering of the vertical wall face between the magnet disc and the coil. Thus, the dimension of the stepping motor 10 along a longitudinal direction of the magnetizing coil 13b can be reduced. In addition, the vertical wall face 27b extends integrally and continuously from the bottom wall 26 of the lower housing portion 11b along one side of the concaved portion 27, so that this structure affords strength large enough to prevent the movement of the magnetizing coil 13b.

An inclined face 27c having an inclined angle toward the bottom face 27a of the concaved portion 27 is formed at an upper edge of the vertical wall face 27b by chamfering this upper edge. The chamfered upper edge portions of the vertical wall faces of the concaved portions prevent the phenomenon that the unchamfered upper edge portion of the vertical wall face 27b would damage the flange portion 21b or the like of the magnetizing coil 13b when the yoke 13a having the magnetizing coil 13b fitted thereto is inserted into a predetermined location of the lower housing portion 11b. Since the inclined chamfered face functions as a guide face to guide the magnetizing coil into the concaved portion, it facilitates the arrangement of the yoke 13a into the lower housing portion 11b and assembling the magnetizing coil 13b fitted around the projection 19 into the housing portion.

Such an inclined face 27 may be omitted, but chamfering to form the inclined face 27c is preferable in that damaging of the magnetizing coil during assembling the magnetizing coil 13b is prevented, the magnetizing coil 13b is assuredly and easily located in the concaved portion 27 as a predetermined position for facilitating the assembling.

According to the invention of claim 1, since the magnetizing coil is partially received in the concaved portion formed in the inner wall of the housing in the state that the coil is inserted around the yoke, the coil is prevented from moving toward the rotor through engagement of the coil with a wall face of the concaved portion without entering between the rotor and the magnetizing coil. Therefore, the interference between the rotor and the magnetizing coil can be assuredly prevented without the dimension of the stepping motor being increased by the entering of the projection between the rotor and the magnetizing coil like the conventional technique.

According to an aspect of the invention in claim 2, the concaved portion is formed in at least one of the upper and lower housing portions of the housing, so that the magnetizing coil can be relatively easily and assuredly prevented from moving toward the rotor from the predetermined location.

According to a further aspect of the invention in claim 3, the interference between the magnetizing coil and the rotor can be assuredly prevented through the wall face of the concaved portion being brought into contact with the flange portion provided at the bobbin of the magnetizing coil.

According to a still further aspect of the invention of claim 4, the chamfered upper edge portions of the rising wall faces of the concaved portions of the housing portion prevent the phenomenon that the unchamfered upper edge portion of the concaved portion would damage the magnetizing coil during fitting the magnetizing coil into the concaved portion when the magnetizing coil inserted around the projection of the yoke is inserted together with the yoke into one of the housing portions in which the concaved portion is provided.

According to a still further aspect of the invention of claim 5, the upper edge of the rising wall face is an inclined face having a vertically descending angle toward a bottom of the concaved portion. Thus, since the inclined face functions as a guide face to guide the magnetizing coil into the concaved portion when the magnetizing coil is partially inserted into the concaved portion, it facilitates the operation of assembling the magnetizing coil fitted around the yoke into the housing portion.

What is claimed is:

1. A stepping motor comprising a housing, a rotor and a stator received in the housing, said stator comprising a yoke, said yoke comprising a frame portion surrounding the rotor and a plurality of projections projecting from said frame portion toward the rotor, cylindrical magnetizing coils inserted around said projections, respectively and each adapted to receive supply of a pulse current, wherein an inner wall of the housing is formed with a concaved portion to receive said magnetizing coils inserted around the respective projections, respectively while being kept spaced from said rotor, wherein a wall face rises from a bottom face of the concaved portion at a near side of the rotor and prevents contact between the magnetizing coils and the rotor through contacting the magnetizing coils, and an upper edge of the rising wall face is chamfered and forms an inclined face having a vertically descending angle toward a bottom of the concaved portion for facilitating arranging of the magnetizing coils into the concaved portion.

2. The stepping motor set forth in claim 1, wherein said housing comprises an upper housing portion and a lower housing portion engaged with the upper housing portion, said upper and lower housing portions housing said yoke therebetween in cooperation with each other, said concaved portion is formed in one of the upper and lower housing portions and adapted to receive the magnetizing coil.

3. The stepping motor set forth in claim 2, wherein each of the magnetizing coils comprises a bobbin and a wound wire, said bobbin comprising a barrel portion to be inserted around a corresponding projection and a pair of flange portions formed at opposite ends of the barrel portion, said wound wire being wound around the barrel portion, and the movement of the magnetizing coil toward the rotor is prevented by contacting that one of the flange portions which is positioned at a side of the rotor with said wall face.

4. The stepping motor set forth in claim 1, wherein said housing comprises an upper housing portion and a lower housing portion engaged with the upper housing portion, said upper and lower housing portions housing said yoke therebetween in cooperation with each other, said concaved portion is formed in each of the upper and lower housing portions and adapted to receive the magnetizing coil.

* * * * *